United States Patent
Fairgrieve et al.

(10) Patent No.: US 9,511,769 B2
(45) Date of Patent: Dec. 6, 2016

(54) SPEED CONTROL METHOD AND SYSTEM

(71) Applicant: Jaguar Land Rover Limited

(72) Inventors: Andrew Fairgrieve, Rugby (GB); James Kelly, Solihull (GB)

(73) Assignee: Jaguar Land Rover Limited (GB)

( * ) Notice: Subject to any disclaimer, the term of this patent is extended or adjusted under 35 U.S.C. 154(b) by 0 days.

(21) Appl. No.: 14/379,956

(22) PCT Filed: Feb. 20, 2013

(86) PCT No.: PCT/EP2013/053384
§ 371 (c)(1),
(2) Date: Aug. 20, 2014

(87) PCT Pub. No.: WO2013/124320
PCT Pub. Date: Aug. 29, 2013

(65) Prior Publication Data
US 2015/0006056 A1    Jan. 1, 2015

(30) Foreign Application Priority Data

Feb. 20, 2012 (GB) .................................. 1202878.3

(51) Int. Cl.
*B60W 30/16* (2012.01)
*B60W 50/00* (2006.01)

(52) U.S. Cl.
CPC ...... *B60W 30/16* (2013.01); *B60W 2050/0095* (2013.01); *B60W 2420/52* (2013.01); *B60W 2520/10* (2013.01); *B60W 2550/302* (2013.01); *B60W 2550/306* (2013.01); *B60W 2550/308* (2013.01); *B60W 2550/402* (2013.01); *B60W 2720/10* (2013.01)

(58) Field of Classification Search
CPC ................... B60W 2720/10; B60W 2550/302; B60W 30/16
See application file for complete search history.

(56) References Cited

U.S. PATENT DOCUMENTS

| | | |
|---|---|---|
| 3,952,301 A | 4/1976 | Sorkin |
| 4,622,636 A | 11/1986 | Tachibana |
| (Continued) | | |

FOREIGN PATENT DOCUMENTS

| | | |
|---|---|---|
| CN | 101263026 A | 9/2008 |
| FR | 2912981 A1 | 8/2008 |
| (Continued) | | |

OTHER PUBLICATIONS

International Search Report for application No. PCT/EP2013/053384, dated May 23, 2013, 4 pages.
(Continued)

*Primary Examiner* — Khoi Tran
*Assistant Examiner* — Ryan Rink
(74) *Attorney, Agent, or Firm* — Myers Bigel P.A.

(57) ABSTRACT

Autonomous cruise control is provided to permit one vehicle to follow another at a predetermined separation regardless of gradient. A system and method is disclosed which continually determines the separation distance of the vehicles, the speed of the leading vehicle and the location of the leading vehicle, to the intent that the following vehicle computes the required speed upon reaching the instant location of the lead vehicle.

19 Claims, 3 Drawing Sheets

(56) References Cited

U.S. PATENT DOCUMENTS

| | | | |
|---|---|---|---|
| 6,560,525 B1* | 5/2003 | Joyce | B60K 31/0008 |
| | | | 180/168 |
| 9,150,220 B2* | 10/2015 | Clarke | B60W 30/00 |
| 2004/0102889 A1 | 5/2004 | Ibrahim | |
| 2008/0162011 A1 | 7/2008 | Pfeiffer et al. | |
| 2009/0299598 A1* | 12/2009 | Boecker | B60W 30/16 |
| | | | 701/96 |
| 2010/0134320 A1* | 6/2010 | Chevion | G08G 1/164 |
| | | | 340/932 |
| 2011/0106364 A1 | 5/2011 | Braeuchle et al. | |
| 2011/0224844 A1* | 9/2011 | Farwell | G05D 1/0295 |
| | | | 701/2 |
| 2012/0191318 A1* | 7/2012 | Holzmann | B60W 30/16 |
| | | | 701/96 |
| 2013/0060456 A1* | 3/2013 | Pourparhizkar | G08G 1/22 |
| | | | 701/117 |
| 2013/0151058 A1* | 6/2013 | Zagorski | B60W 30/09 |
| | | | 701/23 |
| 2014/0121928 A1* | 5/2014 | Kurumisawa | B60T 8/1755 |
| | | | 701/70 |
| 2014/0163837 A1* | 6/2014 | Um | B60W 30/143 |
| | | | 701/93 |

FOREIGN PATENT DOCUMENTS

| | | |
|---|---|---|
| JP | S59180956 U | 12/1984 |
| JP | H03118699 A | 5/1991 |
| JP | H06191324 A | 7/1994 |
| JP | 06248990 A | 9/1994 |
| JP | H09286257 A | 11/1997 |
| JP | 2006524603 A | 11/2006 |
| JP | 2007168788 A | 7/2007 |
| JP | 2010235083 A | 10/2010 |

OTHER PUBLICATIONS

Great Britain Combined Search and Examination Report for application No. GB1202878.3, dated Jun. 11, 2012, 8 pages.
Written Opinion for application No. PCT/EP2013/053384, dated May 23, 2013, 5 pages.
English summary of Japanese Office action corresponding to JP application No. 2014-557083, dated Nov. 17, 2015, 2 pages.
Office Action Summary, JP Application No. 2014-557083, Aug. 16, 2016, 6 pages.
The Second Office Action, CN 201380010019.8, Sep. 14, 2016, 26 pages.

* cited by examiner

FIGURE 6

SPEED CONTROL METHOD AND SYSTEM

FIELD OF THE INVENTION

The present invention relates to vehicle cruise control and in particular, but not exclusively, to a system whereby one vehicle can follow another at slow speed, at a prescribed distance. Such systems are known by many names, including autonomous or adaptive cruise control (ACC). Some aspects of the present invention relate to a queue assist function allowing one vehicle can follow another at slow speed, at a prescribed distance, such as in queuing traffic.

BACKGROUND

Cruise control allows a vehicle to automatically maintain a pre-set speed regardless of gradient. Autonomous cruise control uses laser or radar based devices to allow one vehicle to automatically follow another at a predetermined separation. The invention disclosed herein is not concerned with the general means of autonomous cruise control, and is applicable to many such systems. Autonomous cruise control is typically used in high speed, highway driving, and may be inhibited below a pre-set minimum speed of, for example 30 kph.

'Queue assist' is a term applied to low speed autonomous cruise control, such as in an urban environment or highway queuing.

Provision of a queue assist function in vehicles is difficult owing to the need to maintain a relatively small distance between vehicles and the frequency of speed variation. Too large a distance in a congested urban environment allows other road users to enter the space ahead of the following vehicle, and speed variation may be across the entire range of an urban speed limit—from say 0 to 64 kph; such conditions are not common in highway driving where speed variation may be not greater than 20% of the maximum permissible.

Furthermore in highway driving the frequency of events which may interrupt autonomous cruise control is relatively low compared with an urban environment, and for this reason autonomous cruise control may be enabled only above a speed threshold of for example about 30 kph.

In an off-highway environment, a group of vehicles may comprise an experienced lead driver, and novice followers. Queue assist would be desirable so as to maintain vehicle progress whilst allowing novice drivers to concentrate on other tasks, such as steering. Vehicles adapted for off-highway use may include adaptive systems for recognizing the terrain being crossed, and automatically placing the vehicle in a suitable traction mode; this facilitates close following of vehicles in difficult terrain conditions, provided that a queue assist function can be provided.

Conventional protocols for autonomous cruise control specify maximum rates of acceleration and deceleration of the following vehicle. The provide for comfort and security of the occupants of the following vehicle. The driver of the following vehicle may of course manually override these pre-set rates if desired, and other vehicle systems may also be relied upon, such as collision avoidance systems.

If in cruise control mode, the following vehicle will attempt to catch up the lead vehicle at the prescribed rate until the separation distance is at the predetermined value. This means that the following vehicle will travel faster than the lead vehicle from time to time to reduce a separation distance. If the lead vehicle reduces speed, the following vehicle will also reduce speed to maintain an appropriate separation distance.

With a conventional approach, for highway driving, this strategy is appropriate. However in an urban or off-highway environment a lead vehicle may dramatically reduce speed for an obstruction, for example a road hump or ditch, and subsequently increase speed to a safe value. The following vehicle will also reduce speed, and accelerate in unison with the lead vehicle. This may mean that the following vehicle reaches the obstruction at a higher speed than is desirable.

Embodiments of the invention may provide an apparatus, a method or a vehicle which addresses one or more the above problems. Other aims and advantages of the invention will become apparent from the following description, claims and drawings.

SUMMARY OF THE INVENTION

Aspects of the invention provide a method, a system and a vehicle as claimed in the appended claims.

According to one aspect of the invention there is provided a method of autonomous vehicle cruise control whereby a following vehicle maintains a substantially pre-determined separation from a lead vehicle, the method comprising the steps of repeatedly:
  determining from the following vehicle the separation distance of the lead vehicle and following vehicle;
  determining from the following vehicle, the speed of the lead vehicle;
  determining from the following vehicle the relative location of the lead vehicle;
  and controlling the speed of the following vehicle to substantially match the speed of the lead vehicle at the said location.

Advantageously, the method may be automatically enabled upon operation of autonomous cruise control at a speed of less than a prescribed value.

In an aspect of the invention for which protection is sought there is provided a method of autonomous vehicle speed control whereby a following vehicle maintains a substantially pre-determined separation from a lead vehicle, the method comprising repeatedly:
  determining from the following vehicle the separation distance of the lead vehicle and following vehicle;
  determining from the following vehicle, the speed of the lead vehicle;
  determining from the following vehicle the relative location of the lead vehicle;
  and controlling the speed of the following vehicle to substantially match the speed of the lead vehicle at the said location,
  whereby the method is automatically enabled upon operation of autonomous speed control at a speed of less than a prescribed value.

The method may be automatically enabled upon operation of autonomous cruise control at a speed of less than a prescribed value being a first value.

In addition or instead the method may be automatically enabled upon operation of low speed progress control at a speed of less than a prescribed value being a second value.

The low speed progress control function may be operable to control vehicle speed at lower speeds than a cruise control system. The low speed progress control function may be configured to enable, low speed progress control under off-road conditions. In some embodiments the low speed progress control function may be operable to continue vehicle speed control even if a wheel slip event occurs in which a traction control system (TCS) or the like takes corrective action. It is to be understood that if such a wheel slip event takes place when a cruise control system is active, speed control by means of the cruise control system is normally cancelled. This is because cruise control is normally suited to on-road driving conditions where wheel slip events are expected to be relatively rare. Under off-road conditions such events may be relatively frequent and therefore the low speed progress control system may be arranged to accommodate such events.

The first and second values may be substantially the same.

The first and second value may be different.

It is to be understood that in some embodiments having a cruise control function and a low speed control function, the first value may be greater than the second value. Alternatively the first value may be less than the second value. Other arrangements are also useful.

The separation distance may be determined by a wave transmitted by the following vehicle, reflected by the lead vehicle, and received by the following vehicle.

The method may include transmitting and receiving from the following vehicle an electromagnetic wave.

The method may include progressively determining the distance travelled by the following vehicle.

Said distance may be provided by a vehicle odometer system, or an analogue thereof.

The method may include repeatedly determining the location of the following vehicle.

The location may be determined by reference to a GPS system.

The method may have a refresh rate of 10 Hz or greater.

The prescribed value of speed may be in the range from 20 kph to 80 kph, optionally in the range from 40 kph to 70 kph, further optionally in the range from 55 kph to 65 kph, optionally around 60 kph.

In a further aspect of the invention for which protection is sought there is provided an autonomous speed control system adapted to permit a following vehicle to follow a lead vehicle at a substantially predetermined separation, said system being arranged to repeatedly determine the separation distance of said vehicles, the speed of the lead vehicle, and the relative location of the lead vehicle, and to control the speed of the following vehicle to match the speed of the lead vehicle at the said location when the system is operating and the speed of the following vehicle is less than a prescribed value.

The autonomous speed control system may comprise a cruise control system, the cruise control system being operable to control the speed of the following vehicle to match the speed of the lead vehicle at the said location when the cruise control system is controlling vehicle speed and the speed of the following vehicle is less than a first value.

The autonomous speed control system may comprise a low speed progress control system, the low speed control system being operable to control the speed of the following vehicle to match the speed of the lead vehicle at the said location when the low speed progress control system is controlling vehicle speed and the speed of the following vehicle is less than a second value.

The system may be implemented in a speed control module of a vehicle, said module having an input signal indicative of the instant location of said vehicle, and said module being adapted to track said signal.

The signal may be indicative of the geographical location of said vehicle.

The signal may be indicative of the location of said vehicle relative to a leading vehicle.

In one aspect of the invention for which protection is sought there is provided a vehicle incorporating a system according to the preceding aspect.

According to another aspect of the invention there is provided an autonomous cruise control system adapted to permit a following vehicle to follow a lead vehicle at a predetermined separation, said system being arranged to repeatedly determine the separation distance of said vehicles, the speed of the lead vehicle, and the location of the lead vehicle, thereby to compute the required speed of the following vehicle when reaching the location of the lead vehicle.

Embodiments of the present invention overcome the prior art difficulty by tracking the relative geographical position of the lead vehicle from the following vehicle so that the following vehicle has substantially the same speed as the lead vehicle at the instant location of the lead vehicle.

Embodiments of the present invention are applicable to a conventional autonomous cruise control system adapted for high speed highway use, which is adapted to continually determine separation distance and speed. Knowing the speed of the following vehicle, the speed of the lead vehicle can be determined from the change of separation distance over time. The invention provides the additional reference of a location, which may be provided in any convenient manner, for example from GPS information, or by suitable location recognition techniques.

In an embodiment, the separation distance is determined by a wave transmitted by the following vehicle, reflected by the lead vehicle, and received by the following vehicle.

In an embodiment the wave is an electromagnetic wave.

The prescribed value of speed may be in the range from 20 kph to 80 kph, optionally in the range from 40 kph to 70 kph, further optionally in the range from 55 kph to 65 kph optionally around 60 kph.

Thus, in an embodiment the method and system of the invention is automatically enabled upon operation of autonomous cruise control at a speed at loss than 60 kph.

Alternatively the geographical location of the following vehicle may be computed relative to the lead vehicle (separation distance), information from a vehicle odometer system being used to determine when the following vehicle has reached the location of the lead vehicle.

Thus can a following vehicle be adapted to closely follow the speed variation of a lead vehicle throughout the possible speed range, so as to mimic the speed of the lead vehicle at the instant geographical location thereof.

For highway driving, relative geographical position may be sufficient since wheel slip is negligible; accordingly odometer information may be provided by a count of, for example, wheel rotations of the following vehicle. This count permits the following vehicle to know when it has reached the instant location of the lead vehicle.

In off-highway driving, wheel slip may be encountered, and accordingly some other means of giving a geographical reference may be required, such as GPS information, radar recognition of a static target, or in camera based terrain recognition technique.

In one aspect of the invention for which protection is sought there is provided a method of autonomous vehicle cruise control whereby a following vehicle maintains a substantially pre-determined separation from a lead vehicle, the method comprising the steps of repeatedly:

determining from the following vehicle the separation distance of the lead vehicle and following vehicle;

determining from the following vehicle, the speed of the lead vehicle;

determining from the following vehicle the relative location of the lead vehicle;

and controlling the speed of the following vehicle to substantially match the speed of the lead vehicle at the said location.

The separation distance may be determined by a wave transmitted by the following vehicle, reflected by the lead vehicle, and received by the following vehicle.

The method may include the step of transmitting and receiving from the following vehicle an electromagnetic wave.

The method may include the step of progressively determining the distance travelled by the following vehicle.

The distance may be provided by a vehicle odometer system, or an analogue thereof.

The method may include the step of repeatedly determining the location of the following vehicle.

The location may be determined by reference to a GPS system.

The method may have a refresh rate of 10 Hz or greater.

The method may be automatically enabled upon activation of autonomous cruise control.

The method may be automatically enabled upon operation of autonomous cruise control at a speed of less than 60 kph.

In a further aspect of the invention for which protection is sought there is provided an autonomous low speed cruise control system adapted to permit a following vehicle to follow a lead vehicle at a substantially predetermined separation, said system being arranged to repeatedly determine the separation distance of said vehicles, the speed of the lead vehicle, and the relative location of the lead vehicle, and to control the speed of the following vehicle to match the speed of the lead vehicle at the said location.

The system may be implemented in a cruise control module of a vehicle, said module having an input signal indicative of the instant location of said vehicle, and said module being adapted to track said signal.

The signal may be indicative of the geographical location of said vehicle.

The signal may be indicative of the location of said vehicle relative to a leading vehicle.

In a still further aspect of the invention for which protection is sought there is provided a vehicle incorporating a system according to the preceding aspect.

In one aspect of the invention autonomous cruise control is provided to permit one vehicle to follow another at a predetermined separation regardless of gradient. A system and method is disclosed which continually determines the separation distance of the vehicles, the speed of the leading vehicle and the location of the leading vehicle, to the intent that the following vehicle computes the required speed upon reaching the instant location of the lead vehicle.

Within the scope of this application it is expressly intended that the various aspects, embodiments, examples and alternatives set out in the preceding paragraphs, in the claims and/or in the following description and drawings, and in particular the individual features thereof, may be taken independently or in any combination. For example, features disclosed in connection with one embodiment are applicable to all embodiments, unless such features are incompatible.

BRIEF DESCRIPTION OF DRAWINGS

The present invention will now be described, by way of example only, with reference to the accompanying drawings, in which.

DETAILED DESCRIPTION

Figure 1:
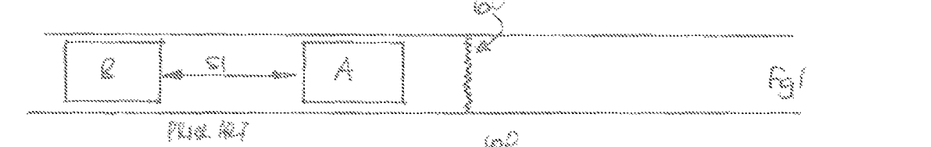
FIGS. 1 to 4 are a schematic representation of the operation of a vehicle having a known autonomous cruise control system (ACC)

With reference to the drawings, FIG. 1 illustrates a prier art arrangement, in which there is shown a lead vehicle A, a following vehicle B at a pre-set separation distance S1 and an obstruction 60, such as a road hump, in advance of the lead vehicle A. FIG. 1 illustrates a steady state condition with vehicles A and B travelling at the same speed.

Figures 2, 3:
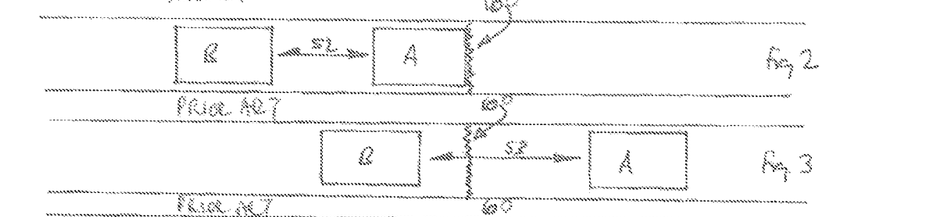

In FIG. 2, the load vehicle A has slowed for the obstruction 60, and in consequence the separation distance S of the vehicles reduces from S1 to S2.

In FIG. 3 the lead vehicle A has passed the obstruction 60 and accelerated to the steady state speed. In consequence the separation distance S has increased from S2 to S3.

Figure 4:
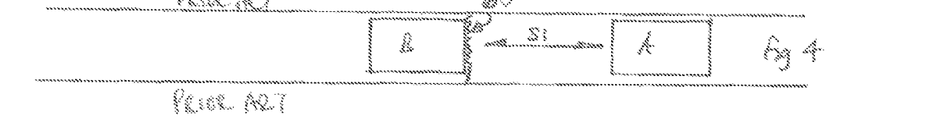

In FIG. 4 the following vehicle B, reacting to the increased separation distance, accelerates to match the speed of the lead vehicle A, so as to achieve the desired separation distance S1. The consequence is that the following vehicle B momentarily accelerates towards the obstruction 60, which is undesirable.

Figure 5:
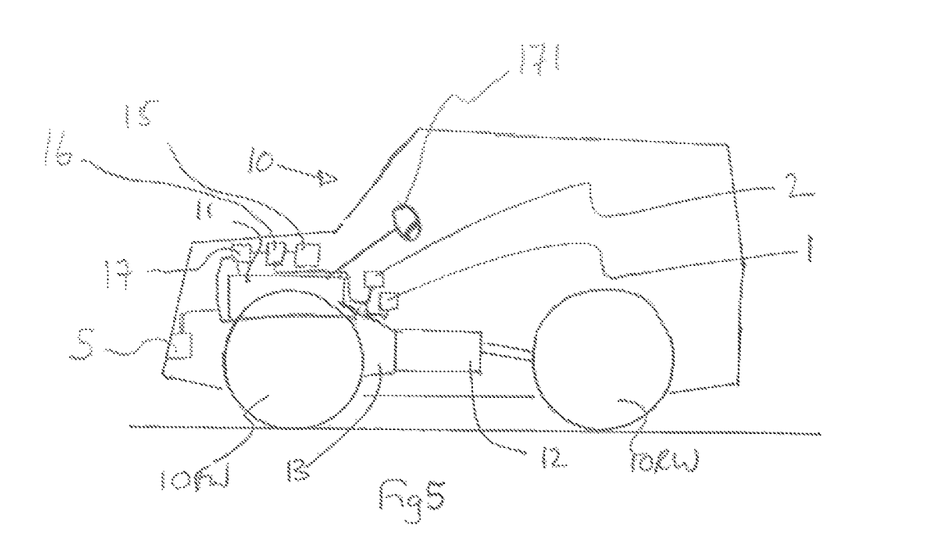
FIG. 5 is a schematic illustration of a vehicle according to an embodiment of the present invention.

FIG. 5 is a schematic illustration of a vehicle 10 according to an embodiment of the present invention that is configured to overcome the problem described above with respect to the prior art. The vehicle 10 has a prime mover or motor 11 in the form of an internal combustion engine. The engine 11 is coupled to a transmission 12 by means of a coupling 13. The coupling 13 is arranged to allow the transmission 12 progressively to reach a speed compatible with motor speed when the vehicle 10 is accelerated from rest. The coupling 13 is typically a friction clutch, torque converter or the like. An accelerator pedal 1 allows a driver to control an amount of torque developed by the motor 11 under the control of a powertrain controller 17 whilst a brake pedal 2 allows a driver to apply a braking system under the control of as brake controller 18.

The vehicle 10 has a vehicle control unit (VCU) 15 that is operable to implement a vehicle speed control function, which may be referred to as a speed control system. The speed control function is controlled by a user by means of input controls mounted to a steering wheel 171 of the vehicle 10. The steering wheel 171 is shown in more detail in FIG. 6.

Figure 6:
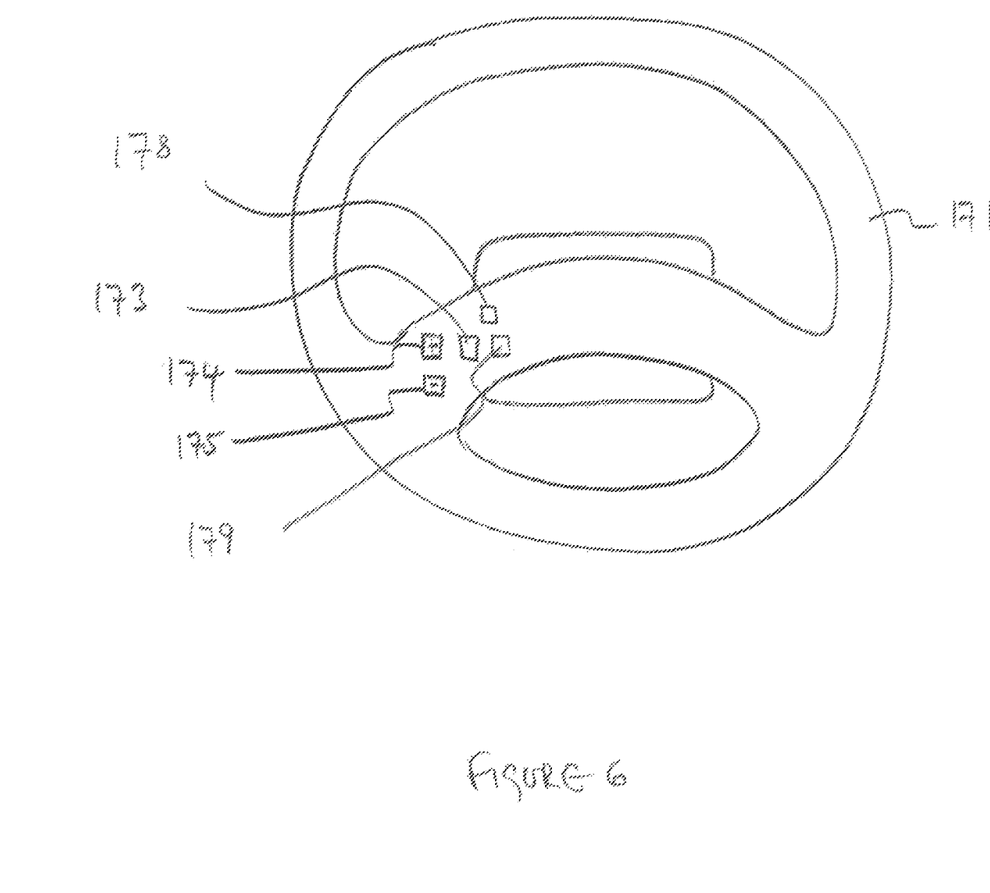
FIG. 6 is a schematic illustration of a steering wheel of a vehicle according to an embodiment of the present invention.

The steering wheel 171 bears input controls allowing a user to control the speed control system. The input controls include a 'set-speed' control 173, actuation of which sets the value of a parameter driver_set_speed to be substantially equal to the current vehicle speed. Depression of a '+' button 174 allows the set speed to be increased whilst depression of a '−' button 175 allows the set speed to be decreased. In some embodiments, if the speed control function is not active when the '+' button 174 is depressed, the speed control function is activated.

The wheel 171 also has a pair of following distance control buttons 178, 179 for setting a value of a parameter distance being the distance the driver desires the vehicle 100 to maintain behind a lead vehicle. The VCU 15 is operable to control the vehicle 10 to maintain a distance behind a lead vehicle that is substantially equal to distance_following. A first of the buttons 178 is operable to increase the value of the parameter distance_following whilst a second of the buttons 179 is operable to decrease the value of the parameter distance_following.

The vehicle 10 has a radar module 5 mounted to a front thereof arranged to project a radar beam in a direction ahead of the vehicle. The module 5 is arranged to detect radiation reflected by a lead vehicle and to determine a distance of the lead vehicle from vehicle 10 (being a 'host' vehicle). The module 5 is provided with a signal indicative of a current speed of the host vehicle 10. From this signal and data in respect of a variation in distance of the lead vehicle from the host vehicle 10 as a function of time, the module 5 is able to calculate a speed of the lead vehicle. Other arrangements for determining distance from the lead vehicle and speed of the lead vehicle are also useful.

When the speed control function is activated, the VCU 15 controls the speed of the vehicle 10 to be substantially equal to a driver set speed driver_set_speed. The driver may set the value of driver_set_speed by depressing the 'set speed' control 173 whilst the vehicle is travelling. When the VCU 15 detects that the 'set speed' control 173 has been pressed, the VCU 15 takes a snapshot of the current speed of the vehicle 10 and sets the value of driver_set_speed to correspond to the current speed.

When the vehicle 10 is travelling along a road at a speed exceeding a minimum allowable set speed set_speed_min, the VCU is operable to allow the user to command the VCU 15 to maintain the current vehicle speed by depressing set speed control 173. In the absence of traffic ahead of the vehicle 10, the VCU 15 controls the speed of the vehicle 10 to maintain the set speed.

If the VCU 15 detects (by means of radar module 5) the presence of a lead vehicle ahead of the vehicle 10, the VCU 15 is operable to reduce the speed of the host vehicle 10 according to the speed of the lead vehicle in order to maintain a distance behind the lead vehicle that is no less than a prescribed distance. The prescribed distance may be set by a driver by means of 'following distance' control buttons 178, 179.

The VCU 15 is configured wherein if the speed of the vehicle 10 is below a prescribed value and the vehicle 10 is following a lead vehicle, the VCU 15 monitors the speed of the lead vehicle and controls the speed of the host vehicle 10 such that it substantially matches that of the lead vehicle at a given geographical location when the host vehicle 10 reaches that geographical location. Thus, if the lead vehicle slows down to drive over a speed bump or other obstruction, the host vehicle 10 slows down at substantially the same location to driver over the same obstruction. This feature has the advantage that acceleration of the vehicle 10 towards an obstruction such as a speed bump when following a lead vehicle is prevented.

Operation of a motor vehicle 10 according to an embodiment of the present invention is illustrated with respect to FIGS. 7-11, FIGS. 7-9 correspond to FIGS. 1-3.

Figure 7:
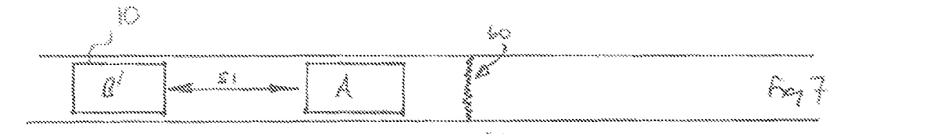
FIGS. 7 to 11 are a schematic representation of the operation of a vehicle according to an embodiment of the present invention.

FIG. 7 shows a lead vehicle A and a following vehicle B' (being a vehicle 10 according to the embodiment of FIG. 5) at a pre-set separation distance S1. The separation distance S1 has been set by the user by means of the following distance control buttons 178, 179. The lead vehicle A is shown approaching an obstruction 60, such as a road hump, in advance of the following vehicle B'. FIG. 7 illustrates a steady state condition with vehicles A and B' travelling at the same speed.

Figure 8:
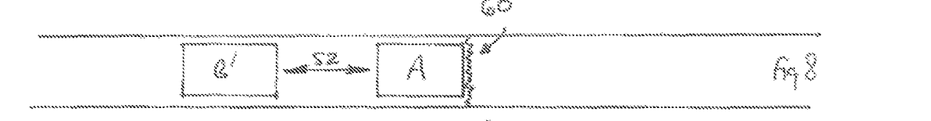

In FIG. 8, the lead vehicle A is shown having slowed for the obstruction 60, and in consequence the separation distance S2 has reduced from S1. The separation distance S2 has reduced from S1 because the VCU 15 is arranged such that the separation distance S is a function of lead vehicle speed. The VCU 15 allows the separation distance to decrease as vehicle speed decreases, but increases the separation distance as vehicle speed increases, in order to maintain a safe following distance.

Figure 9:
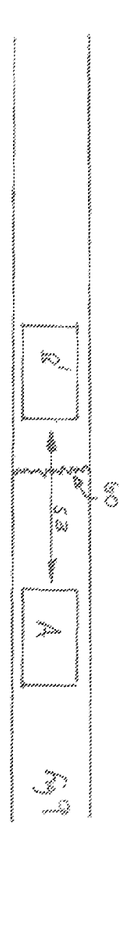

In FIG. 9 the lead vehicle A is shown having passed the obstruction 60 and accelerated to the steady state speed. In consequence the separation distance S3 has increased from S2.

Figure 10:
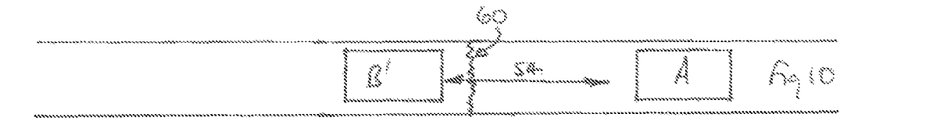

As described above, the VCU 15 tracks the position of the lead vehicle A and the speed thereof at a given location and control the speed of the host vehicle 10 to match that of the lead vehicle B' at the same location. Accordingly, the VCU 15 controls the speed of the vehicle 10 such that it approaches and traverses the obstruction 60 at substantially the same speed as the lead vehicle A, as shown in FIG. 10. In consequence, the user of the host vehicle 10 is not required to override the speed control function in order to maintain vehicle composure as the vehicle negotiates the obstruction 60.

As shown in FIG. 10, the separation distance S increases to S4, which is greater than S3, as the following vehicle 10 negotiates the obstruction 60 and the lead vehicle A accelerates away from the obstruction 60.

Figure 11:
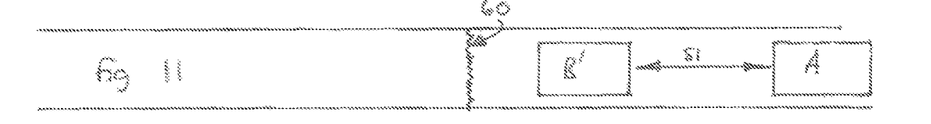

FIG. 11 shows the following vehicle B' after passing the obstruction 60, whilst accelerating to follow the lead vehicle A at the pre-set separation distance S1, or cruise control target speed (driver_set_speed) if the lead vehicle A is travelling faster than the cruise control target speed.

By repeatedly determining the speed of the following vehicle B', the instant location (actual or relative) of the following vehicle B' and the separation distance of the lead vehicle A and the following vehicle B', the speed of the lead vehicle A and the location (actual or relative) of the lead vehicle A can be computed from the following vehicle B' is described above, the separation distance of the lead vehicle A and the following vehicle B' is determined by the following vehicle B' transmitting an electromagnetic wave, which is reflected by the lead vehicle A and received by the forming vehicle B'. Thus a command signal to the cruise control system of the following vehicle B' can give information concerning the speed which the following vehicle B' should observe at the instant location of the lead vehicle A.

The following vehicle B' knows the instant relative location of the lead vehicle A, since the separation distance is measured, and accordingly the speed of the following vehicle B' can be adjusted by the time it has reached the instant location of the lead vehicle A, so that it substantially matches the speed of the lead vehicle A when it was at that location.

Embodiments of the present invention may permit the actual location of the lead and following vehicles A, B' to be determined by progressively determining the distance travelled by the following vehicle B' from a known location, typically by using the vehicle odometer or an analogue thereof.

The vehicles A, B' may be assumed to be of similar capability and road conditions may be assumed to be substantially identical along the path of travel, so that the following vehicle B' can substantially mimic the speed changes of the lead vehicle A at the same geographic locations.

Embodiments of the present invention may be implemented in any suitable manner, but are typically incorporated in an autonomous cruise control module of a vehicle. The module may form part of a vehicle control unit 15 as in the embodiment of FIG. 1, or be in the form of a separate, discrete module. Thus such a (following) vehicle B' provides a continual update of vehicle speed (i.e. its own speed), and the relative separation distance of the lead vehicle A. From these inputs the cruise control module can calculate the changing speed of the lead vehicle A rather than just monitoring the separation distance thereof. Thus the cruise control module is continually updated with not only the instant separation distance but also the instant speed of the lead vehicle A. Knowing this instant speed, the cruise control module determines that the speed of the following vehicle B' should be controlled so that after travelling the instant separation distance, the following vehicle B' will be at the speed of the lead vehicle A at that location.

The cruise control module is also configured to determine that adjustments of speed of the following vehicle B' are within pre-set limits of acceleration and deceleration to ensure that comfort and safety of the vehicle occupants is assured; typical limits are acceleration at up to 1.25 m/s$^2$ and deceleration at up to 2.5 m/s$^2$. Thus, if the lead vehicle A accelerates or decelerates at a rate exceeding the prescribed limits, the following vehicle B' does not try to match the rate assumed by the lead vehicle A, but caps the rate of acceleration or deceleration at the prescribed values. When the lead vehicle A decelerates at a rate exceeding the prescribed value, the following vehicle B' may be operable to commence deceleration early so as to ensure that a speed of the following vehicle B' does not exceed that of the lead vehicle A at a given position, whilst also avoiding deceleration at a rate exceeding the prescribed value. Thus, the following vehicle B' anticipates the requirement to reduce speed and may reduce speed at a rate higher than the lead vehicle A at a given geographical location thereby preventing the rate of deceleration from exceeding the prescribed value. Other arrangements are also useful, it is to be understood that in some embodiments the following vehicle B' may nevertheless be operable to decelerate at a rate exceeding the limit value in order to prevent collision when a collision risk exists.

In the embodiment described above and illustrated in FIGS. 5 to 11, matching of following vehicle speed to lead vehicle speed at the same geographical location is enabled automatically by the VCU 15 when vehicle speed is below a prescribed value. In the present embodiment, the prescribed value is substantially 60 kph although other values are also useful. Thus, the speed control function may be optimised for urban driving, where obstacles may be encountered relatively frequently, and highway driving, where obstacles are encountered relatively rarely. When travelling at speeds exceeding 60 kph on a highway, variations in speed of a lead vehicle are typically due to density of moving traffic, rather than to stationary obstacles. Accordingly, implementation of speed control to match lead vehicle speed at the same geographic location may be inconvenient to a user of the following vehicle. However, in an urban or off-road environment, speed control according to geographic location may be highly advantageous, such as when approaching an obstacle such as a road hump (as described in detail above), a pothole or any other suitable obstacle negotiation of which may involve a decrease in vehicle speed in order to avoid loss of vehicle composure.

Embodiments of the invention may be understood by reference to the following numbered paragraphs:

1. A method of autonomous vehicle speed control whereby a following vehicle maintains a substantially predetermined separation from a lead vehicle, the method comprising repeatedly:
   determining from the following vehicle the separation distance of the lead vehicle and following vehicle;
   determining from the following vehicle, the speed of the lead vehicle;
   determining from the following vehicle the relative location of the lead vehicle;
   and controlling the speed of the following vehicle to substantially match the speed of the lead vehicle at the said location,
whereby the method is automatically enabled upon operation of autonomous speed control at a speed of less than a prescribed value.

2. A method according to paragraph 1, whereby the method is automatically enabled upon operation of autonomous cruise control at a speed of less than a prescribed value being a first value.

3. A method according to paragraph 1 whereby the method is automatically enabled upon operation of low speed progress control at a speed of less than a prescribed value being a second value.

4. A method according to paragraph 2 whereby the method is automatically enabled upon operation of low speed progress control at a speed of less than a prescribed value being a second value, whereby the first and second values are substantially the same.

5. A method according to paragraph 2 whereby the method is automatically enabled upon operation of low speed progress control at a speed of less than a prescribed value being a second value, whereby the first and second values are different.

6. A method according to paragraph 1, whereby the separation distance is determined by a wave transmitted by the following vehicle, reflected by the lead vehicle, and received by the following vehicle.

7. A method according to paragraph 1, and including transmitting and receiving from the following vehicle an electromagnetic wave.

8. A method according to paragraph 1, and including progressively determining the distance travelled by the following vehicle.

9. A method according to paragraph 8, whereby said distance is provided by a vehicle odometer system, or an analogue thereof.

10. A method according to paragraph 1, and including repeatedly determining the location of the following vehicle.

11. A method according to paragraph 10, whereby location is determined by reference to a GPS system.

12. A method according to paragraph 1, and having a refresh rate of 10 Hz or greater.

13. A method according to paragraph 1 whereby the prescribed value of speed is in the range from 20 kph to 80 kph, optionally in the range from 40 kph to 70 kph, further optionally in the range from 65 kph to 65 kph, optionally around 60 kph.

14. An autonomous speed control system adapted to permit a following vehicle to follow a lead vehicle at a substantially predetermined separation, said system being arranged to repeatedly determine the separation distance of said vehicles, the speed of the lead vehicle, and the relative location of the lead vehicle, and to control the speed of the following vehicle to match the speed of the lead vehicle at the said location when the system is operating and the speed of the following vehicle is less than a prescribed value.

15. An autonomous speed control system according to paragraph 14 comprising a cruise control system, the cruise control system being operable to control the speed of the following vehicle to match the speed of the lead vehicle at the said location when the cruise control system is controlling vehicle speed and the speed of the following vehicle is less than a first value.

16. An autonomous speed control system according to paragraph 14 comprising a low speed progress control system, the low speed control system being operable to control the speed of the following vehicle to match the speed of the lead vehicle at the said location when the low speed progress control system is controlling vehicle speed and the speed of the following vehicle is less than a second value.

17. A system according to paragraph 14, and implemented in a speed control module of a vehicle, said module having an input signal indicative of the instant location of said vehicle, and said module being adapted to track said signal.

18. A system according to paragraph 17, wherein said signal is indicative of the geographical location of said vehicle.

19. A system according to paragraph 17, wherein said signal is indicative of the location of said vehicle relative to a leading vehicle.

20. A vehicle incorporating the system of paragraph 14.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A method of vehicle speed control whereby a following vehicle maintains a substantially pre-determined separation from a lead vehicle, the method comprising repeatedly:
determining from the following vehicle the separation distance of the lead vehicle and following vehicle;
determining from the following vehicle the speed of the lead vehicle;
determining from the following vehicle the relative location of the lead vehicle; and
controlling the speed of the following vehicle to substantially match the determined speed of the lead vehicle when said following vehicle reaches said determined relative location;
wherein the method is automatically enabled upon operation of autonomous speed control of the following vehicle at a following vehicle speed less than a prescribed value, and wherein, at a following vehicle speed above the prescribed value, the autonomous speed control operates to maintain the following vehicle a prescribed distance behind the lead vehicle.

2. A method according to claim 1, wherein the method is automatically enabled during autonomous cruise control at a speed of less than the prescribed value, wherein the autonomous cruise control is an automated speed control system which cancels automatic speed control of the vehicle if a wheel slip event occurs.

3. A method according to claim 2, wherein the method is automatically enabled during low speed progress control at a speed of less than the prescribed value, wherein the low speed progress control is an automated speed control system which continues to automatically control the speed of the following vehicle if a following vehicle wheel slip event occurs.

4. A method according to claim 1, wherein the separation distance is determined by a wave transmitted by the following vehicle, reflected by the lead vehicle, and received by the following vehicle.

5. A method according to claim 1, and including transmitting and receiving from the following vehicle an electromagnetic wave.

6. A method according to claim 1, and including progressively determining the distance travelled by the following vehicle.

7. A method according to claim 6, wherein said distance is provided by a vehicle odometer system, or an analogue thereof.

8. A method according to claim 1, and including repeatedly determining the location of the following vehicle.

9. A method according to claim 8, wherein the location of the following vehicle is determined by reference to a GPS system.

10. A method according to claim 1, wherein said steps are performed repeatedly at a refresh rate of 10 Hz or greater.

11. A method according to claim 2, wherein the prescribed value of speed is in the range from 20 kph to 80 kph.

12. A speed control system adapted to permit a following vehicle to follow a lead vehicle at a substantially predetermined separation, said system being arranged to:
repeatedly determine the separation distance of said vehicles, the speed of the lead vehicle, and the relative location of the lead vehicle; and
control the speed of the following vehicle to match the determined speed of the lead vehicle when said following vehicle reaches the said determined relative location;
wherein said system is automatically enabled during upon operation of autonomous speed control of the following vehicle at a following vehicle speed of less than a prescribed value, and wherein, at a following vehicle speed above the prescribed value, the autonomous speed control operates to maintain the following vehicle a prescribed distance behind the lead vehicle.

13. A system according to claim 12, comprising a cruise control system, the cruise control system being operable to control the speed of the following vehicle to match the speed of the lead vehicle at the said location when the cruise control system is controlling vehicle speed and the speed of the following vehicle is less than a first value.

14. A system according to claim 13, comprising a low speed progress control system, the low speed control system being operable to control the speed of the following vehicle to match the speed of the lead vehicle at the said location when the low speed progress control system is controlling vehicle speed and the speed of the following vehicle is less than a second value.

15. A system according to claim 12, and implemented in a speed control module of said following vehicle, said module having an input signal indicative of an instant location of said following vehicle, and said module being adapted to track said signal.

16. A system according to claim 15, wherein said signal is indicative of the geographical location of said following vehicle.

17. A system according to claim 15, wherein said signal is indicative of the location of said following vehicle relative to said leading vehicle.

18. A vehicle, comprising a speed control system, wherein the speed control system is adapted to permit the vehicle to follow a lead vehicle at a substantially predetermined separation, and wherein the speed control system is configured to:
    repeatedly determine a separation distance of the vehicles, a speed of the lead vehicle, and a relative location of the lead vehicle; and
    control a speed of the vehicle to match the determined speed of the lead vehicle when the vehicle reaches the relative location;
    wherein the speed control system is automatically enabled upon operation of autonomous speed control of the vehicle at a vehicle speed of less than a prescribed value, and wherein, at a following vehicle speed above the prescribed value, the autonomous speed control operates to maintain the following vehicle a prescribed distance behind the lead vehicle.

19. A system according to claim 12 wherein, when the system is operating and the speed of the following vehicle is less than a prescribed value, said system controls the speed of the following vehicle to match the determined speed of the lead vehicle when said following vehicle reaches the said determined relative location.

* * * * *